(12) United States Patent
Fukushima

(10) Patent No.: US 7,755,687 B2
(45) Date of Patent: Jul. 13, 2010

(54) IMAGING DEVICE AND METHOD OF COMPENSATING SENSITIVITY OF THE IMAGING DEVICE

(75) Inventor: Akira Fukushima, Kodaira (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 477 days.

(21) Appl. No.: 11/740,394

(22) Filed: Apr. 26, 2007

(65) Prior Publication Data

US 2007/0263094 A1 Nov. 15, 2007

(30) Foreign Application Priority Data

Apr. 27, 2006 (JP) .............................. 2006-123019

(51) Int. Cl.
*H04N 3/14* (2006.01)
*H04N 5/335* (2006.01)
*H04N 9/64* (2006.01)
*H01J 40/14* (2006.01)

(52) U.S. Cl. .................. 348/300; 348/244; 250/207

(58) Field of Classification Search ............. 348/294, 348/300, 301, 311, 244; 250/305, 311
See application file for complete search history.

(56) References Cited

U.S. PATENT DOCUMENTS

| | | | |
|---|---|---|---|
| 5,508,740 A * | 4/1996 | Miyaguchi et al. ......... 348/244 |
| 6,643,455 B1 * | 11/2003 | Malmstrom ................ 396/4 |
| 2006/0090787 A1 * | 5/2006 | Onvural .................. 136/212 |
| 2006/0226375 A1 * | 10/2006 | Maruo .................... 250/458.1 |
| 2006/0245050 A1 * | 11/2006 | Uchida et al. ............. 359/391 |
| 2008/0303933 A1 * | 12/2008 | Kondo et al. ............. 348/311 |

FOREIGN PATENT DOCUMENTS

| JP | 6-245123 | | 9/1994 |
| JP | 7-170437 | | 7/1995 |
| WO | WO2006009164 | * | 1/2006 |

* cited by examiner

*Primary Examiner*—Sinh Tran
*Assistant Examiner*—Albert H Cutler
(74) *Attorney, Agent, or Firm*—Brundidge & Stanger, P.C.

(57) ABSTRACT

In an image pickup device and its sensitivity compensation method, the image pickup device includes an electron multiplying image pickup device for converting an image into an electrical signal, a temperature detection unit for detecting temperature of the electron multiplying image pickup device, and a control unit for controlling electron multiplication factor of the electron multiplying image pickup device in response to the temperature detected.

9 Claims, 7 Drawing Sheets

IMAGING DEVICE AND METHOD OF COMPENSATING SENSITIVITY OF THE IMAGING DEVICE

INCORPORATION BY REFERENCE

The present application claims priority from Japanese application JP2006-123019 filed on Apr. 27, 2006, the content of which is hereby incorporated by reference into this application.

BACKGROUND OF THE INVENTION

The present invention relates to an image pickup device. More particularly, it relates to sensitivity compensation for an electron multiplying image pickup device.

Conventionally, the following example has been disclosed in JP-A-6-245123: In order to keep the temperature of the image pickup device, the temperature of the image pickup device is detected by a temperature detector. Moreover, based on the temperature detected, the image pickup device is cooled or heated by a thermoelectric cooling element.

Also, a temperature control circuit of a Peltier element has been disclosed in JP-A-7-170437. This temperature control circuit is set up in the vicinity of a photoelectric conversion plane of an image pickup tube or the like in order to prevent an excessive rise or lowering in temperature of the photoelectric conversion plane.

SUMMARY OF THE INVENTION

In the above-described technologies, the unit for isothermalizing the image pickup device has been disclosed. However, when the ambient temperature of the image pickup device rises or lowers, and thus exceeds cooling or heating capability of the cooling device, there exists the following problem: Namely, it becomes impossible to isothermalize the image pickup device. This situation gives rise to a variation in the sensitivity of an image signal outputted from the image pickup device.

An object of the present invention is as follows: Namely, the sensitivity of an image signal outputted from the electron multiplying image pickup device is maintained at a constant value even when the cooling unit set up on the electron multiplying image pickup device is exceeded in its cooling or heating capability by influences of the ambient temperature.

An image pickup device according to the present invention includes an electron multiplying image pickup device for converting an image into an electrical signal, a temperature detection unit for detecting temperature of the electron multiplying image pickup device, and a control unit for controlling electron multiplication factor of the electron multiplying image pickup device in response to the temperature detected. A sensitivity compensation method of compensating sensitivity of the image pickup device according to the present invention includes steps of detecting temperature of an electron multiplying image pickup device for converting an image into an electrical signal, and controlling electron multiplication factor of the electron multiplying image pickup device in response to the temperature detected.

According to the present invention, the sensitivity of an image signal outputted from the electron multiplying image pickup device can be maintained at a constant value even when the cooling unit set up on the electron multiplying image pickup device is exceeded in its cooling or heating capability by influences of the ambient temperature.

Other objects, features and advantages of the invention will become apparent from the following description of the embodiments of the invention taken in conjunction with the accompanying drawings.

DESCRIPTION OF THE EMBODIMENTS

Hereinafter, referring to FIG. 1, the explanation will be given below concerning an embodiment of the image pickup device according to the present invention.

Figure 1:
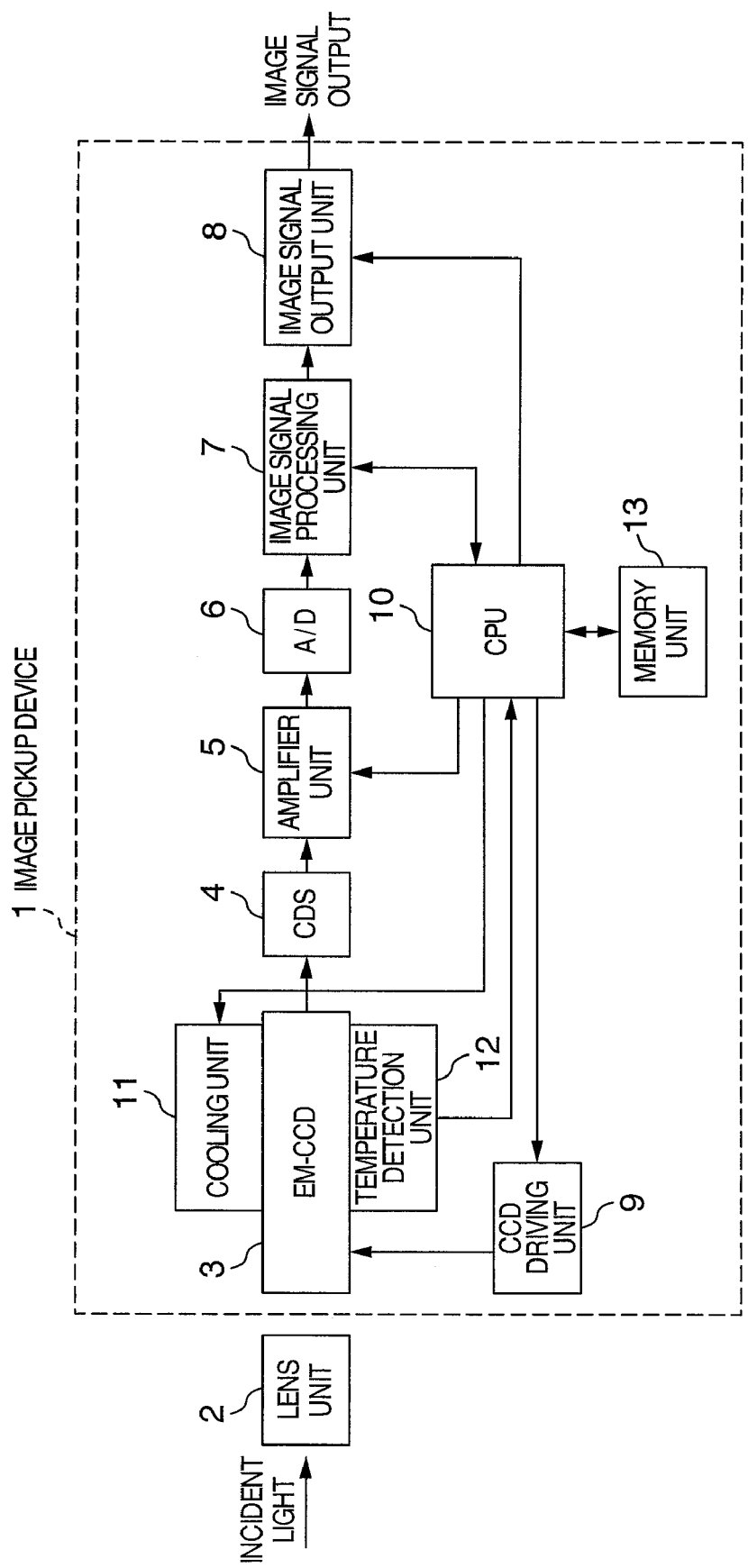
FIG. 1 is a block diagram for illustrating the configuration of an embodiment of the image pickup device according to the present invention.

FIG. 1 is a block diagram for illustrating the configuration of an embodiment of the image pickup device according to the present invention. Incidentally, FIG. 1 describes only the components which are needed for explaining the image pickup device.

In FIG. 1, the reference numerals denote the components as follows: 1 denotes an image pickup device, 2 denotes a lens unit for image-forming incident light onto an image pickup plane, 3 denotes an electron multiplying image pickup device, e.g., an EM-CCD (Electron Multiplying-Charge Coupled Device) for converting the incident light incident from the lens unit 2 into an electrical signal, 4 denotes a CDS (Correlated Double Sampling) unit for eliminating noise from the electrical signal outputted from the EM-CCD 3, 5 denotes a variable gain amplifier unit for adjusting amplitude of a signal outputted from the CDS unit 4, 6 denotes an A/D conversion unit (Analog Digital Converter) for converting an analog signal outputted from the amplifier unit 5 into a digital signal, 7 denotes an image signal processing unit for applying various types of image processings to the digital signal, 8 denotes an image signal output unit for outputting a signal outputted from the image signal processing unit 7 after converting the signal into an image signal of a predetermined scheme, 9 denotes a CCD driving unit for performing driving of the EM-CCD 3 and gain control over the electron multiplying, and 10 denotes a CPU (Central Processing Unit) for controlling the respective units inside the image pickup device 1 in accordance with predetermined programs. Also, 11 denotes a temperature control unit for cooling or heating the EM-CCD 3, 12 denotes a temperature detection unit for detecting temperature of the EM-CCD 3, and 13 denotes a memory unit for storing in advance the temperature characteristics data on the EM-CCD 3.

The image signal of a predetermined scheme outputted from the image signal output unit 8 refers to a motion image or still image according to, e.g., NTSC (National Television System Committee) scheme, PAL (Phase Alternating by Line) scheme, HDTV (High Definition Television) scheme, or another scheme.

Next, referring to FIG. 1 to FIG. 6 and FIG. 9, the explanation will be given below concerning the operation of an embodiment according to the present invention.

In FIG. 1, the EM-CCD 3 of the image pickup device 1 applies a photoelectric conversion to incident light whose image is formed onto a photoelectric conversion unit by the lens unit 2. Then, the EM-CCD 3 outputs the resultant electrical signal to the CDS unit 4. The CDS unit 4 eliminates noise from the signal outputted from the EM-CCD 3, then outputting a noiseless signal to the amplifier unit 5. The amplifier unit 5 amplifies the signal outputted from the CDS unit 4 in accordance with a gain control signal outputted from the CPU 10, then outputting an amplified signal to the A/D conversion unit 6. The A/D conversion unit 6 converts the amplified analog signal outputted from the amplifier unit 5 into, e.g., a 10-bit digital signal, then outputting the digital signal to the image signal processing unit 7. The image signal processing unit 7 applies various types of image processings, such as gamma correction and profile emphasis, to the digital signal, then outputting the image-processed signal to the image signal output unit 8. The image signal output unit 8 converts the signal outputted from the image signal processing unit 7 into an image signal of a predetermined scheme, then outputting this image signal. In accordance with a control signal outputted from the CPU 10, the CCD driving unit 9 outputs a signal for driving the EM-CCD 3 and a control signal for controlling the electron multiplication factor. Also, the CPU 10 controls the temperature control unit 11 from the temperature of the EM-CCD 3 obtained from the temperature detection unit 12, thereby maintaining the EM-CCD 3 at a predetermined temperature. The temperature control unit 11 is a thermoelectric element for converting electric energy into thermal energy. Namely, the unit 11 is, e.g., a temperature-control-capable Peltier element for absorbing or generating heat in response to an electric current supplied thereto. When the electric current supplied to the Peltier element is increased, the temperature will lower on one side of the Peltier element, whereas the temperature will rise on the other side thereof. In the embodiment of the present invention illustrated in FIG. 1, the Peltier element is used as the temperature control unit 11. The plane on which the temperature will lower when the current supplied to the Peltier element is increased is set up on a reverse surface of the front surface having the photo-sensing area of the EM-CCD 3, thereby being used as a cooling device for the EM-CCD 3. Accordingly, in the explanation of the embodiment relating to FIG. 1, the temperature control unit 11 is referred to as the cooling unit 11.

Figure 9:
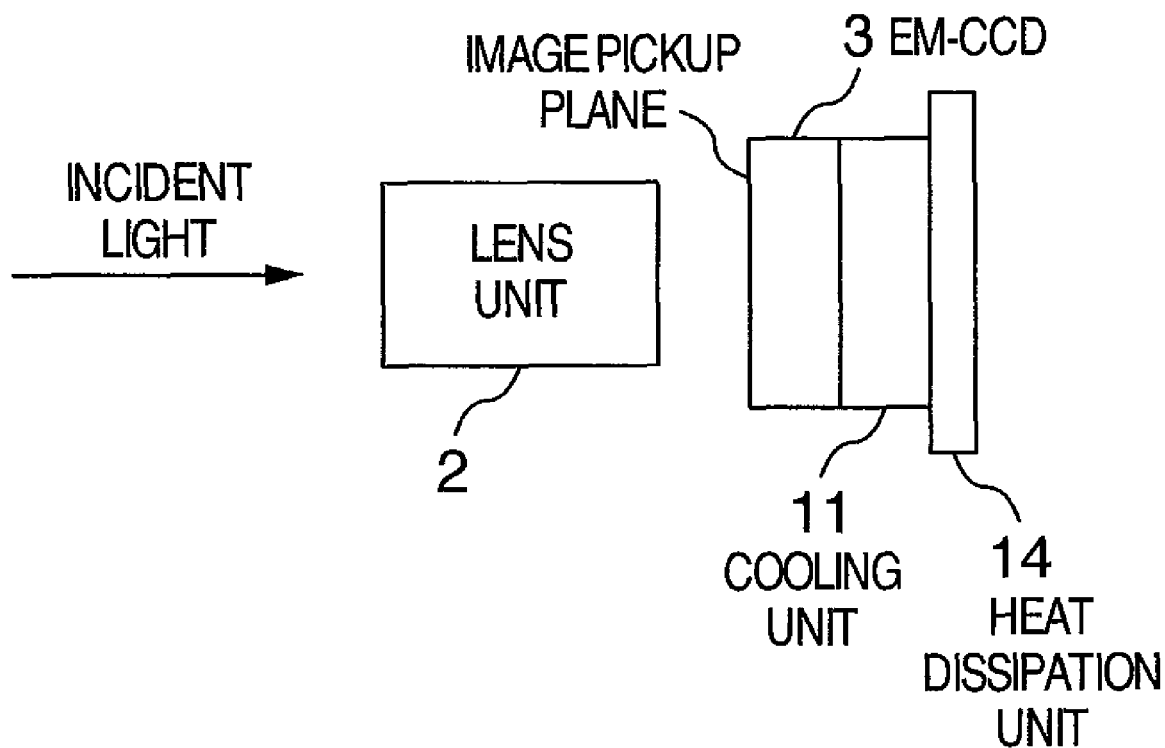
FIG. 9 is a structure diagram for explaining the set-up of the EM-CCD and the cooling unit, i.e., the embodiment of the image pickup device according to the present invention.

FIG. 9 is a set-up structure diagram for explaining the arrangement between the EM-CCD 3 and the cooling unit 11. The cooling unit 11 and a heat dissipation unit 14 are set up in this order on the plane on the other side of the image pickup plane of the EM-CCD 3. The heat dissipation unit 14 is a heat dissipation plate or an air-cooled fan. By setting up the cooling unit 11 in such a manner that the EM-CCD 3 is located at the central portion of the heat absorption plane of the Peltier element of the cooling unit 11, it becomes possible to cool the image pickup plane of the EM-CCD 3 uniformly.

Figure 2:
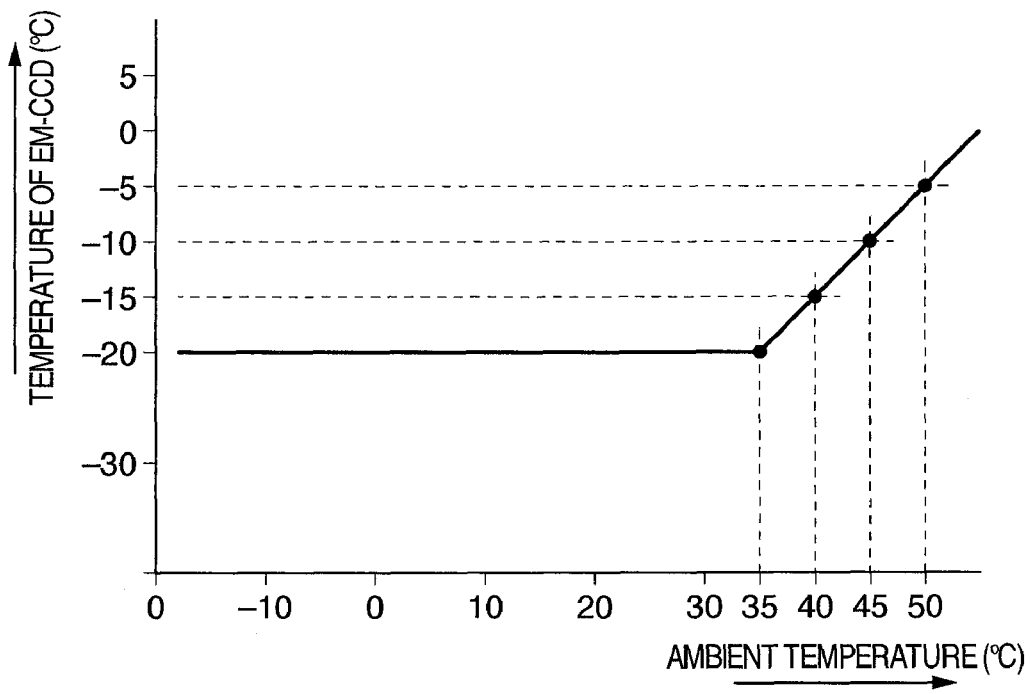
FIG. 2 is a diagram for explaining the relationship between ambient temperature and the temperature of the electron multiplying image pickup device in the case where the electron multiplying image pickup device is cooled by the cooling unit.

FIG. 2 is a diagram for explaining the relationship between ambient temperature and the temperature of the EM-CCD 3 in the case where the EM-CCD 3 in FIG. 1 is cooled by the cooling unit 11. The transverse axis denotes the ambient temperature, and the longitudinal axis denotes the temperature of the EM-CCD 3.

The cooling unit 11 makes it possible to maintain the EM-CCD 3 at −20° C. until the ambient temperature has reached 35° C. However, if the ambient temperature exceeds 35° C., the temperature of the EM-CCD 3 also rises in proportion to the ambient temperature. FIG. 2 shows that the cooling capability limit of the cooling unit 11, which makes it possible to maintain the EM-CCD 3 at −20° C., is equal to a value obtained by adding internal heat liberation of the EM-CCD 3 to the ambient temperature 35° C.

Figure 3:
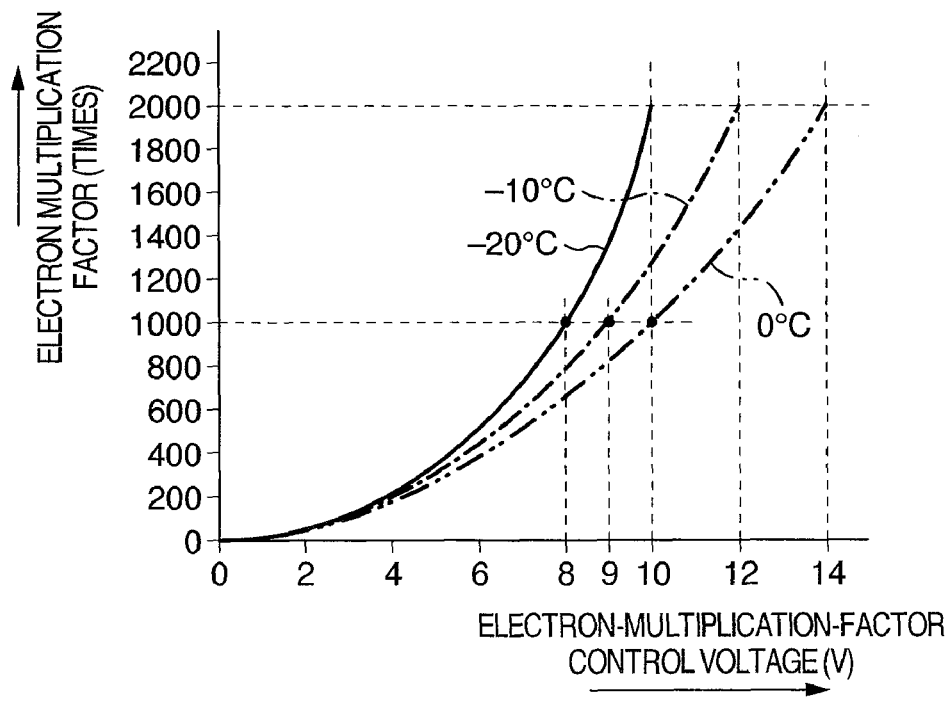
FIG. 3 is a diagram for explaining that the electron multiplication factor of the electron multiplying image pickup device has temperature characteristics.

FIG. 3 is a diagram for explaining that the electron multiplication factor of the EM-CCD 3 has temperature characteristics. In FIG. 3, the transverse axis denotes electron-multiplication-factor control voltage of the EM-CCD 3, and the longitudinal axis denotes the electron multiplication factor of the EM-CCD 3. FIG. 3 indicates voltage-vs.-electron-multiplication-factor characteristics at three different temperatures. From FIG. 3, maintaining the electron multiplication factor of the EM-CCD 3 at, e.g., 1000 times requires that the electron-multiplication-factor control voltage of the EM-CCD 3 be heightened in accordance with the rise in the temperature of the EM-CCD 3. Concretely, when the temperature of the EM-CCD 3 is equal to −20° C., setting the electron multiplication factor at 1000 times requires that the electron-multiplication-factor control voltage be set at 8 V (volt). When the temperature of the EM-CCD 3 is equal to −10° C., setting the electron multiplication factor at 1000 times requires that the electron-multiplication-factor control voltage be set at 9 V. When the temperature of the EM-CCD 3 is equal to 0° C., setting the electron multiplication factor at 1000 times requires that the electron-multiplication-factor control voltage be set at 10 V.

Figures 4, 5:
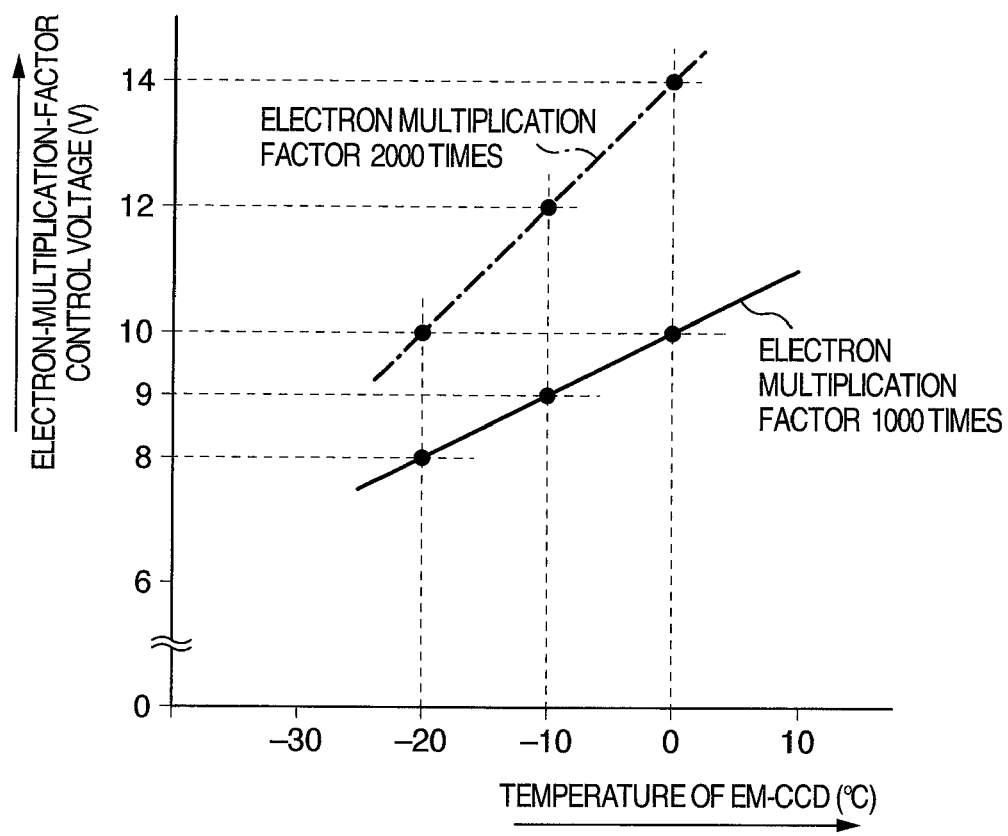
FIG. 4 is a diagram for explaining the relationship between the temperature of the electron multiplying image pickup device and electron-multiplication-factor control voltage.
FIG. 5 is a memory table expressed by converting the characteristics in FIG. 4 into numerical values.

FIG. 4 is a diagram obtained by rewriting FIG. 3 into the relationship between the temperature of the EM-CCD 3 and the electron-multiplication-factor control voltage of the EM-CCD 3. In FIG. 4, the transverse axis denotes the temperature of the EM-CCD 3, the longitudinal axis denotes the electron-multiplication-factor control voltage of the EM-CCD 3, and the parameters denote the electron multiplication factors of the EM-CCD 3.

FIG. 5 is a memory table expressed by converting the characteristics in FIG. 4 into numerical values. This data table is stored in advance into the memory unit 13 in FIG. 1.

Figure 6:
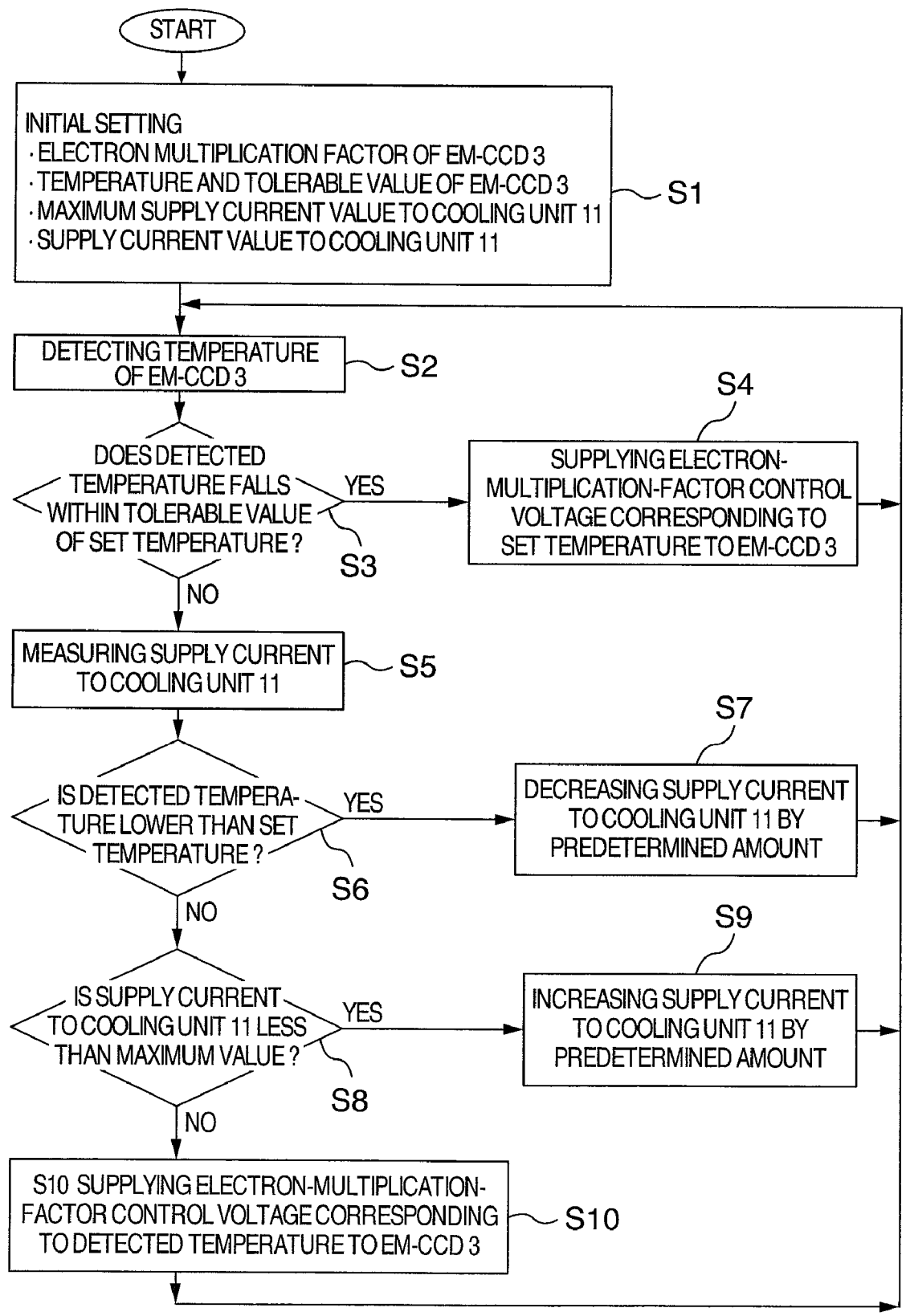
FIG. 6 is a flowchart for explaining the operation for maintaining the sensitivity of the electron multiplying image pickup device at a constant value, i.e., an embodiment of the sensitivity compensation method for the image pickup device according to the present invention.

FIG. 6 is a flowchart for explaining the operation for maintaining the sensitivity of the electron multiplying image pickup device at a constant value, i.e., an embodiment of the sensitivity compensation method of the present invention.

Next, referring to FIG. 6, the explanation will be given below concerning the operation for maintaining the sensitivity of the electron multiplying image pickup device at a constant value, i.e., an embodiment of the sensitivity compensation method of the present invention.

The CPU 10 starts the control from "START" in FIG. 6, then performing an initial setting at a step S1. In the initial setting, e.g., the electron multiplication factor of the EM-CCD 3 is set at 1000 times, the temperature and its tolerable value of the EM-CCD 3 to be maintained at a constant value is set at −20.0±0.5° C., maximum supply current value to the cooling unit 11 is set at 10 A (ampere), and initial supply current value thereto is set at 1 A. At a step S2, the temperature of the EM-CCD 3 is detected by the temperature detection unit 12. At a step S3, the comparison is made between the detected temperature of the EM-CCD 3 and −20.0±0.5° C. set at the initial setting. Then, if the detected temperature of the EM-CCD 3 falls within −20.0±0.5° C., the CPU 10 proceeds to a processing at a step S4. Meanwhile, if the detected temperature of the EM-CCD 3 falls outside −20.0±0.5° C., the CPU 10 proceeds to a processing at a step S5. At the step S4, in order to maintain the electron multiplication factor of the EM-CCD 3 at 1000 times initially set at the step S1, the CPU 10 reads data on the electron-multiplication-factor control voltage of 8 V from the data table (FIG. 5) stored in the memory unit 13. Then, the CPU 10 instructs the CCD driving unit 9 to supply the 8-V electron-multiplication-factor control voltage to the EM-CCD 3. The CCD driving unit 9 supplies the 8-V electron-multiplication-factor control voltage to the EM-CCD 3. Next to the processing at the step S4, the CPU 10 returns to the processing at the step S2. At the step S5, present supply current value to the cooling unit 11 is determined by being actually measured. At a step S6, the comparison is made between the temperature of the EM-CCD 3 and −20.0±0.5° C. of the initial setting. Then, if the temperature of the EM-CCD 3 is lower than −20.0±0.5° C. of the initial setting, the CPU 10 proceeds to a processing at a step S7. Meanwhile, if the temperature of the EM-CCD 3 is higher than −20.0±0.5° C. of the initial setting, the CPU 10 proceeds to a processing at a step S8. At the step S7, in order to heighten the temperature of the EM-CCD 3, the current value to be supplied to the cooling unit 11 is decreased by a predetermined amount from the present current value determined by being measured at the step S5. The predetermined amount is, e.g., 0.1 A. Here, this predetermined reduction amount can be determined at an arbitrary value which is the optimum value obtained by way of experiment. At the step S8, the comparison is made between the present supply current value to the cooling unit 11 determined at the step S5 and the 10-A maximum supply current value of the initial setting. Then, if the present supply current value to the cooling unit 11 is less than 10 A, the CPU 10 proceeds to a processing at a step S9. Meanwhile, if the present supply current value to the cooling unit 11 is more than 10 A, the CPU 10 proceeds to a processing at a step S10. At the step S9, in order to lower the temperature of the EM-CCD 3, the current value to be supplied to the cooling unit 11 is increased by a predetermined amount from the present supply current. The predetermined amount is, e.g., 0.1 A. Here, this predetermined increase amount can be determined at an arbitrary value which is the optimum value obtained by way of experiment. Next to the processing at the step S9, the CPU 10 returns to the processing at the step S2. At the step S10, the electron-multiplication-factor control voltage corresponding to the temperature of the EM-CCD 3 detected at the step S2 is supplied to the EM-CCD 3. In the processing at the step S10, when the detected temperature of the EM-CCD 3 is equal to, e.g., −10° C., the CPU 10 reads the 9-V electron-multiplication-factor control voltage corresponding to the 1000-times electron multiplication factor from the data table (FIG. 5) stored in the memory unit 13. Then, the CPU 10 instructs the CCD driving unit 9 to supply the 9-V electron-multiplication-factor control voltage to the EM-CCD 3. The CCD driving unit 9 supplies the 9-V electron-multiplication-factor control voltage to the EM-CCD 3. Next to the processing at the step S4, the CPU 10 returns to the processing at the step S2.

Within the cooling capability range of the cooling unit 11, by performing the processings as described above, the temperature of the EM-CCD 3 can be maintained at a predetermined temperature (e.g., −20.0±0.5° C. in the embodiment of the present invention). Accordingly, the sensitivity of an image signal outputted from the EM-CCD 3 can be maintained at a constant value. Moreover, when the temperature of the EM-CCD 3 exceeds the cooling capability range of the cooling unit 11, by changing the electron-multiplication-factor control voltage of the EM-CCD 3 in accordance with the temperature of the EM-CCD 3, the sensitivity of an image signal outputted from the EM-CCD 3 can be maintained at a constant value.

In the embodiment of the present invention, when the temperature of the EM-CCD 3 exceeds the cooling capability range of the cooling unit 11, the sensitivity of an image signal outputted from the EM-CCD 3 can be maintained at a constant value by changing only the electron-multiplication-factor control voltage of the EM-CCD 3 in accordance with the temperature of the EM-CCD 3. Furthermore, as another embodiment, when the temperature of the EM-CCD 3 exceeds the cooling capability range of the cooling unit 11, the sensitivity of an image signal outputted from the EM-CCD 3 may be maintained at a constant value by controlling both the electron-multiplication-factor control voltage of the EM-CCD 3 and amplification ratio of the variable gain amplifier unit 5 in accordance with the temperature of the EM-CCD 3.

Figure 7:
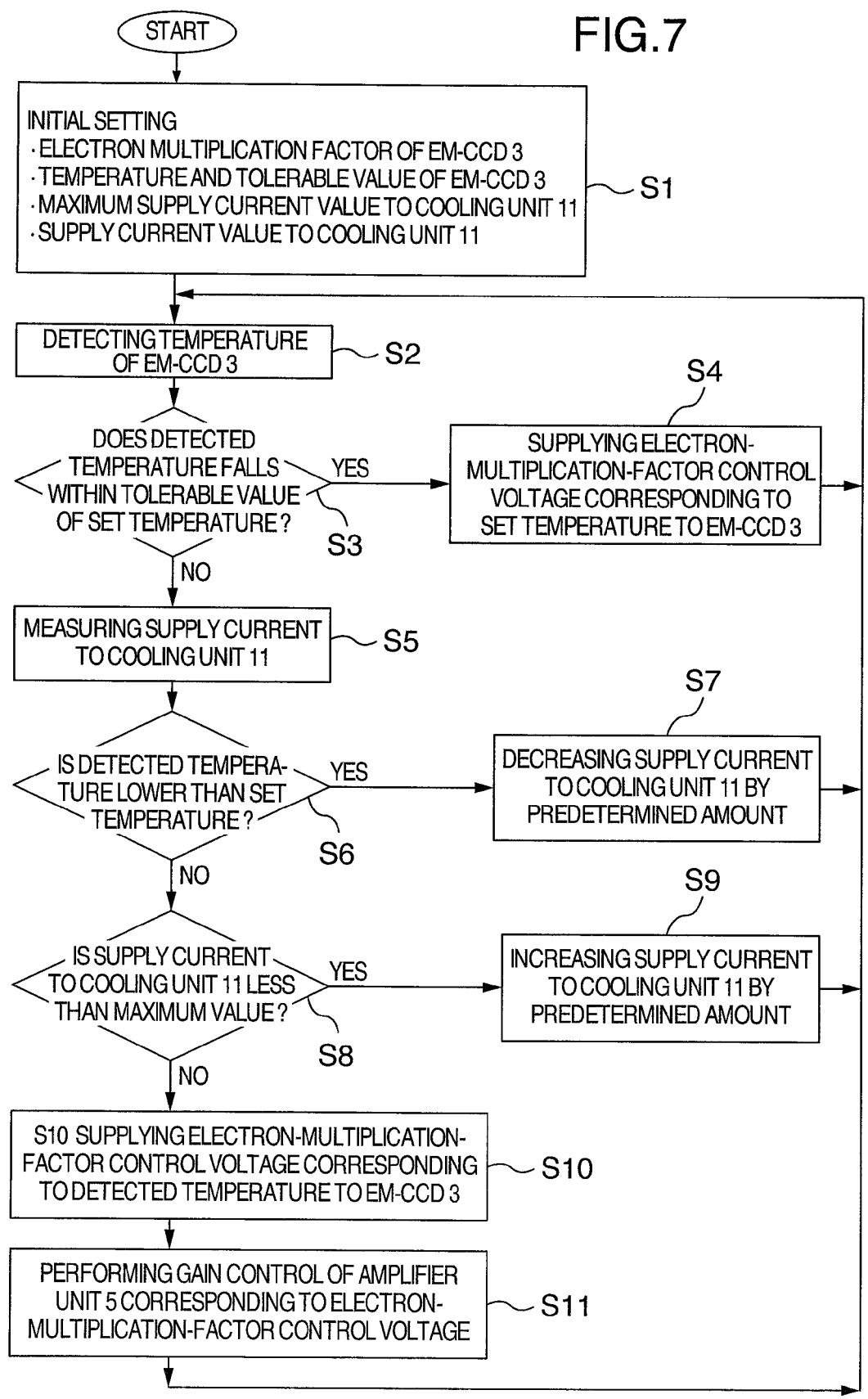
FIG. 7 is a flowchart for explaining the operation for maintaining the sensitivity of an image signal outputted from the image pickup device at a constant value, i.e., another embodiment of the sensitivity compensation method according to the present invention.

Next, referring to FIG. 7, the explanation will be given below concerning the operation of another embodiment of the sensitivity compensation method of the present invention. FIG. 7 is a flowchart for explaining the operation for maintaining the sensitivity of an image signal outputted from the image pickup device at a constant value, i.e., another embodiment of the sensitivity compensation method according to the present invention. Operations ranging from steps S1 to S10 are the same as those in the flowchart illustrated in FIG. 6. In the processing at the step S10, when the detected temperature of the EM-CCD 3 is equal to, e.g., −10° C., the CPU 10 reads the 9-V electron-multiplication-factor control voltage corresponding to the 1000-times electron multiplication factor from the data table (FIG. 5) stored in the memory unit 13. Then, the CCD driving unit 9 supplies the 9-V electron-multiplication-factor control voltage to the EM-CCD 3. Next to the step S10, the CPU 10 proceeds to a processing at a step S11. At the step S11, in order to make a fine adjustment for allowing the sensitivity of an image signal outputted from the image pickup device 1 to be maintained at a constant value, gain of the variable gain amplifier unit 5 is controlled. Here, resolving power of the electron-multiplication-factor control voltage is changed depending on the electron multiplication factor. In particular, the higher the electron multiplication factor becomes, the lower the resolving power of the electron-multiplication-factor control voltage becomes. Accordingly, in the processing at the step 11, the fine adjustment (sensitivity adjustment) of amplitude of the output signal from the EM-CCD 3 is made by controlling the gain of the variable gain amplifier unit 5. Next to the processing at the step S11, the CPU 10 returns to the processing at the step S2.

Also, as still another embodiment, in the structure illustrated in FIG. 9, the Peltier element is used as the cooling unit 11. Moreover, the surface on which the temperature will rise when the current supplied to the Peltier element is increased is set up on the reverse surface of the front surface having photo-sensing area of the EM-CCD 3. By setting up the cooling unit 11 in this way, it becomes possible to heat the image pickup plane of the EM-CCD 3 uniformly.

Also, as still another embodiment, the following Peltier element is used as the cooling unit 11: Namely, when the direction of a direct current supplied to this Peltier element is changed, the temperature on a plane on one side of the Peltier element will lower or rise. One surface of the Peltier element is set up on the reverse surface of the front surface having the photo-sensing area of the EM-CCD 3. Moreover, the temperature of the image pickup plane of the EM-CCD 3 is detected by the temperature detection unit 12. Furthermore, the direction of the direct current and the current value supplied to the Peltier element are changed in accordance with the temperature detected by the temperature detection unit 12. This operation makes it possible to cool or heat the image pickup plane of the EM-CCD 3 uniformly.

Figure 8:
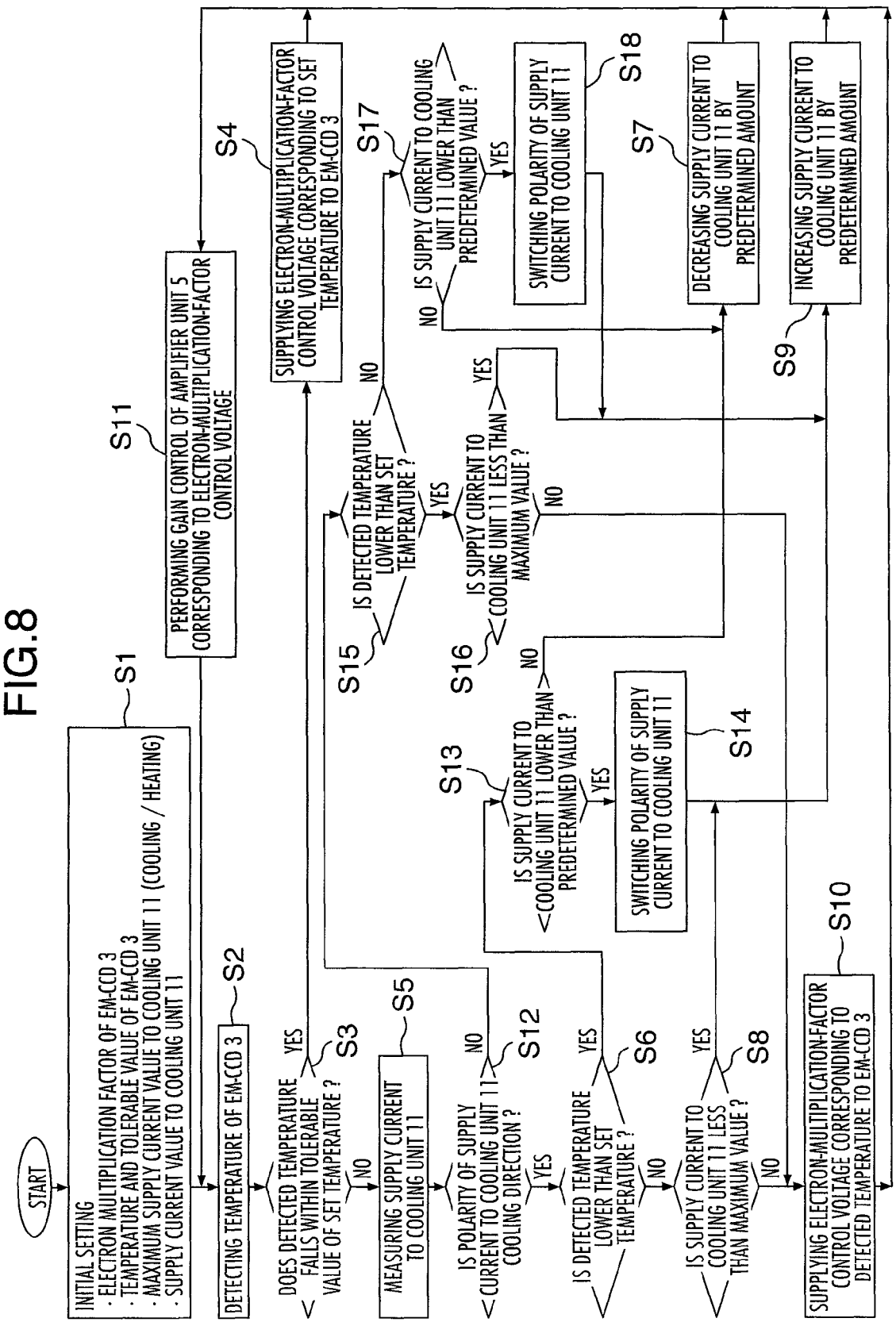
FIG. 8 is a flowchart for explaining the operation for maintaining the sensitivity of an image signal outputted from the image pickup device at a constant value, i.e., still another embodiment of the sensitivity compensation method according to the present invention.

FIG. 8 is a flowchart for explaining the operation for maintaining the sensitivity of an image signal outputted from the image pickup device at a constant value, i.e., still another embodiment of the sensitivity compensation method. Incidentally, in the explanation of this embodiment, the cooling unit 11 can exhibits both of the cooling and heating functions to the EM-CCD 3 depending on the direction of the supply current. Here, however, the designation referred to as "cooling unit" will be employed for convenience.

The CPU 10 starts the control from "START" in FIG. 8, then performing an initial setting at a step S1. In the initial setting, e.g., the electron multiplication factor of the EM-CCD 3 is set at 1000 times, the temperature and its tolerable value of the EM-CCD 3 to be maintained at a constant value is set at −20.0±0.5° C., maximum supply current value to the cooling unit 11 is set at 10 A at the cooling time, and at 10 A in the reverse direction at the heating time, and initial supply current value thereto is set at 1 A. At a step S2, the temperature of the EM-CCD 3 is detected by the temperature detection unit 12. At a step S3, the comparison is made between the detected temperature of the EM-CCD 3 and −20.0±0.5° C. set at the initial setting. Then, if the detected temperature of the EM-CCD 3 falls within −20.0±0.5° C., the CPU 10 proceeds to a processing at a step S4. Meanwhile, if the detected temperature of the EM-CCD 3 falls outside −20.0±0.5° C., the CPU 10 proceeds to a processing at a step S5. At the step S4, in order to maintain the electron multiplication factor of the EM-CCD 3 at 1000 times initially set at the step S1, the CPU 10 reads data on the electron-multiplication-factor control voltage of 8 V from the data table (FIG. 5) stored in the memory unit 13. Then, the CPU 10 instructs the CCD driving unit 9 to supply the 8-V electron-multiplication-factor control voltage to the EM-CCD 3. The CCD driving unit 9 supplies the 8-V electron-multiplication-factor control voltage to the EM-CCD 3. Next to the processing at the step S4, the CPU 10 proceeds to a processing at a step S11. At the step S11, in order to make a fine adjustment for allowing the sensitivity of an image signal outputted from the image pickup device 1 to be maintained at a constant value, gain of the variable gain amplifier unit 5 is controlled. Here, resolving power of the electron-multiplication-factor control voltage is changed depending on the electron multiplication factor. In particular, the higher the electron multiplication factor becomes, the lower the resolving power of the electron-multiplication-factor control voltage becomes. Accordingly, in the processing at the step S11, the fine adjustment (sensitivity adjustment) of amplitude of the image signal from the EM-CCD 3 is made by controlling the gain of the variable gain amplifier unit 5. Next to the processing at the step S11, the CPU 10 returns to the processing at the step S2.

At the step S5, present supply current value to the cooling unit 11 is determined by being actually measured, and then the CPU 10 proceeds to a processing at a step S12. At the step S12, the CPU 10 judges whether the direction of the supply current to the cooling unit 11 is a cooling direction or a heating direction. Then, if the direction of the supply current is the cooling direction, the CPU 10 proceeds to a processing at a step S6. Meanwhile, if the direction is the heating direction, the CPU 10 proceeds to a processing at a step S15.

At the step S6, the comparison is made between the temperature of the EM-CCD 3 and −20.0±0.5° C. of the initial setting. Then, if the temperature of the EM-CCD 3 is lower than −20.0±0.5° C. of the initial setting, the CPU 10 proceeds to a processing at a step S13. Meanwhile, if the temperature of the EM-CCD 3 is higher than −20.0±0.5° C. of the initial setting, the CPU 10 proceeds to a processing at a step S8. At the step S8, the comparison is made between the present supply current value to the cooling unit 11 determined at the step S5 and 10 A of maximum supply current value of the initial setting. Then, if the present supply current value to the cooling unit 11 is less than 10 A, the CPU 10 proceeds to a processing at a step S9. Meanwhile, if the present supply current value to the cooling unit 11 is more than 10 A, the CPU 10 proceeds to a processing at a step S10. At the step S9, in order to lower the temperature of the EM-CCD 3, the current value to be supplied to the cooling unit 11 is increased by a predetermined amount from the present supply current. The predetermined amount is, e.g., 0.1 A. Here, this predetermined increase amount can be determined at an arbitrary value which is the optimum value obtained by way of experiment. Next to the processing at the step S9, the CPU 10 returns to the processing at the step S11. At the step S10, the electron-multiplication-factor control voltage corresponding to the temperature of the EM-CCD 3 detected at the step S2 is supplied to the EM-CCD 3. In the processing at the step S10, when the detected temperature of the EM-CCD 3 is equal to, e.g., −10° C., the CPU 10 reads the 9-V electron-multiplication-factor control voltage corresponding to the 1000-times electron multiplication factor from the data table (FIG. 5) stored in the memory unit 13. Then, the CPU 10 instructs the CCD driving unit 9 to supply the 9-V electron-multiplication-factor control voltage to the EM-CCD 3. The CCD driving unit 9 supplies the 9-V electron-multiplication-factor control voltage to the EM-CCD 3. Next to the processing at the step S10, the CPU 10 returns to the processing at the step S11.

At the step S13, the CPU 10 judges whether or not the supply current to the cooling unit 11 is lower than a predetermined value. The predetermined value is, e.g., 0.09 A. Here, this predetermined value can be determined at an arbitrary value which is the optimum value obtained by way of experiment. Then, in the judgment at the step S13, if the supply current to the cooling unit 11 is lower than the predetermined value, the CPU 10 proceeds to a processing at a step S14. Meanwhile, if the supply current is not lower than the predetermined value, the CPU 10 proceeds to a processing at a step S7. At the step S7, in order to heighten or lower the temperature of the EM-CCD 3, the current value to be supplied to the cooling unit 11 is decreased by a predetermined amount. The predetermined amount is, e.g., 0.1 A. Here, this predetermined reduction amount can be determined at an arbitrary value which is the optimum value obtained by way of experiment. At the step S14, the CPU 10 changes the direction of the supply current to the cooling unit 11, then proceeding to the processing at the step S9. At the step S15, the comparison is made between the temperature of the EM-CCD 3 and −20.0±0.5° C. of the initial setting. Then, if the temperature of the EM-CCD 3 is lower than −20.0±0.5° C. of the initial setting, the CPU 10 proceeds to a processing at a step S16. Meanwhile, if the temperature of the EM-CCD 3 is higher than −20.0±0.5° C. of the initial setting, the CPU 10 proceeds to a processing at a step S17. At the step S16, the comparison is made between the present supply current value to the cooling unit 11 and 10 A of maximum supply current value of the initial setting. Then, if the present supply current value to the cooling unit 11 is less than 10 A, the CPU 10 proceeds to the processing at the step S9. Meanwhile, if the present supply current value to the cooling unit 11 is more than 10 A, the CPU 10 proceeds to the processing at the step S10. At the step S17, the CPU 10 judges whether or not the supply current to the cooling unit 11 is lower than a predetermined value. The predetermined value is, e.g., 0.09 A. Here, this predetermined value can be determined at an arbitrary value which is the optimum value obtained by way of experiment. Then, in the judgment at the step S17, if the supply current to the cooling unit 11 is lower than the predetermined value, the CPU 10 proceeds to a processing at a step S18. Meanwhile, if the supply current is not lower than the predetermined value, the CPU 10 proceeds to the processing at the step S7. At the step S18, the CPU 10 changes the direction of the supply current to the cooling unit 11, then proceeding to the processing at the step S9.

As having been explained so far, according to the present invention, the sensitivity of an image signal outputted from the electron multiplying image pickup device can be maintained at a constant value even when the cooling unit set up on the electron multiplying image pickup device is exceeded in its cooling or heating capability by influences of the ambient temperature.

Referring to the several embodiments, the detailed explanation has been given so far concerning the present invention. It is needless to say, however, that the present invention is not limited to the image pickup device of the embodiments described here, but is widely applicable to such devices as television camera, digital still camera, and licensor camera.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image pickup device, comprising:
an electron multiplying image pickup device for converting an image into an electrical signal;
a temperature detection unit for detecting a temperature of said electron multiplying image pickup device;
a control unit for controlling an electron multiplication factor of said electron multiplying image pickup device in response to said temperature detected; and
a thermoelectric element for cooling or heating said electron multiplying image pickup device,
wherein said control unit comprises:
a temperature control unit for controlling an electric current to be supplied to said thermoelectric element, thereby to control said temperature of said electron multiplying image pickup device to be maintained within a predetermined range, and
an electron-multiplication-factor modification unit for modifying said electron multiplication factor by changing a control voltage to be applied to said electron multiplying image pickup device in response to a value of said detected temperature, when said value of said detected temperature deviates from said predetermined range, and when a value of said electric current being supplied to said thermoelectric element is larger than a predetermined limit value.

2. The image pickup device according to claim 1, wherein said control unit further comprises:
a memory device, said memory device storing a data table for indicating value of said control voltage corresponding to each of values of different temperatures, and
wherein said electron-multiplication-factor modification unit reads said value of said control voltage from said data table of said memory device, and applies said control voltage of said read value to said electron multiplying image pickup device, said value of said control voltage corresponding to said value of said detected temperature which deviates from said predetermined range.

3. The image pickup device according to claim 2, wherein said data table includes data for indicating said value of said control voltage corresponding to each of said values of said different temperatures with respect to each of values of different electron multiplication factors.

4. The image pickup device according to claim 3, wherein said thermoelectric element is a Peltier element, and
wherein said Peltier element is located on a plane on the other side of a light receiving unit of said electron multiplying image pickup device, and said electron multiplying image pickup device is located at a central portion of a heat absorbing plane or heat liberating plane of said Peltier element.

5. The image pickup device according to claim 2, further comprising:
a variable gain amplifier for amplifying an output signal of said electron multiplying image pickup device,
wherein said control unit further comprising:
a gain control unit, said gain control unit modifying gain of said variable gain amplifier by a predetermined value when said value of said detected temperature deviates from said predetermined range, and when said value of said electric current being supplied to said electron multiplying image pickup device is larger than said predetermined limit value.

6. A sensitivity compensation method of compensating sensitivity of an image pickup device, said method, comprising the steps of:
detecting temperature of an electron multiplying image pickup device for converting an image into an electrical signal;
controlling electron multiplication factor of said electron multiplying image pickup device in response to said temperature detected;
controlling an electric current to be supplied to a thermoelectric element mounted on said electron multiplying image pickup device, and cooling or heating said electron multiplying image pickup device, thereby to control said temperature of said electron multiplying image pickup device to be maintained within a predetermined range; and
modifying said electron multiplication factor by changing a control voltage to be applied to said electron multiplying image pickup device in response to a value of said detected temperature, when said value of said detected temperature deviates from said predetermined range, and when a value of said electric current being supplied to said thermoelectric element is larger than a predetermined limit value.

7. The sensitivity compensation method according to claim 6, further comprising the steps of:
   accessing a memory, said memory storing a data table for indicating value of said control voltage corresponding to each of values of different temperatures, and
   reading said value of said control voltage from said data table of said memory, and applying said control voltage of said read value to said electron multiplying image pickup device, said value of said control voltage corresponding to said value of said detected temperature which deviates from said predetermined range.

8. The sensitivity compensation method according to claim 7, wherein said data table includes data for indicating said value of said control voltage corresponding to each of said values of said different temperatures with respect to each of values of different electron multiplication factors.

9. The sensitivity compensation method according to claim 7, further comprising a step of:
   modifying gain of a variable gain amplifier by a predetermined value when said value of said detected temperature deviates from said predetermined range, and when said value of said electric current being supplied to said electron multiplying image pickup device is larger than said predetermined limit value.

* * * * *